United States Patent

Spruyt et al.

[19]

[11] Patent Number: 5,925,608

[45] Date of Patent: Jul. 20, 1999

[54] PACKAGED FOAMING COMPOSITION

[75] Inventors: Michael Felix Spruyt, Zernst; Eddy Vos, Linden, both of Belgium

[73] Assignee: The Procter & Gamble Company, Cincinnati, Ohio

[21] Appl. No.: 08/983,207

[22] PCT Filed: Jul. 10, 1996

[86] PCT No.: PCT/US96/11512

§ 371 Date: Jan. 13, 1998

§ 102(e) Date: Jan. 13, 1998

[87] PCT Pub. No.: WO97/03180

PCT Pub. Date: Jan. 30, 1997

[30] Foreign Application Priority Data

Jul. 13, 1995 [EP] European Pat. Off. .............. 95870084

[51] Int. Cl.⁶ .............................. C11D 3/20; C11D 17/00; D06L 1/02
[52] U.S. Cl. .......................... 510/276; 510/279; 510/283; 510/299; 510/320; 510/338; 510/342; 510/406; 8/137
[58] Field of Search ..................................... 510/276, 279, 510/283, 299, 320, 338, 342, 406; 8/137

[56] References Cited

U.S. PATENT DOCUMENTS

| | | | |
|---|---|---|---|
| 3,741,902 | 6/1973 | Barrett | 510/283 |
| 4,199,482 | 4/1980 | Renaud et al. | 510/284 |
| 4,243,543 | 1/1981 | Guilbert et al. | 510/234 |
| 4,288,339 | 9/1981 | Wilsberg | 510/283 |
| 4,336,024 | 6/1982 | Denissenko et al. | 8/142 |
| 4,652,389 | 3/1987 | Moll | 510/279 |
| 4,655,959 | 4/1987 | Stopper | 252/305 |
| 4,749,516 | 6/1988 | Brusky | 510/248 |
| 4,780,100 | 10/1988 | Moll | 8/137 |
| 4,877,556 | 10/1989 | Wilsberg et al. | 510/283 |
| 4,954,286 | 9/1990 | Sepulveda et al. | 510/284 |
| 5,334,325 | 8/1994 | Chaussee | 510/120 |

*Primary Examiner*—Lorna Douyon
*Attorney, Agent, or Firm*—Jacobus C. Rasser; Kim W. Zerby; D. Mitchell Goodrich

[57] ABSTRACT

A detergent product comprising: (i) a foaming composition which includes: a surfactant, a detergent builder and less than 25%, by weight, of water; (ii) a propellant gas; and a (iii) a container. The viscosity of the foaming composition, measured at 20° C. and 1 atmosphere, using a Brookfield viscometer, No. 2 Spindle at 60 rpm, is less than 700 mPa·s.

9 Claims, No Drawings

PACKAGED FOAMING COMPOSITION

The present invention relates to a packaged product comprising a foaming composition and a propellant gas packaged within a container. In particular the packaged product is a foam dispensing aerosol container.

It is well known in the aerosol industry that there is a need to move out HFC propellants on account of their environmental profile. The replacement choice has mostly been the low molecular weight hydrocarbons such as propane, butane, pentane, hexane, etc., but these are flammable gases which may not always be suitable for use inside confined appliances with potential ignition sources. For these reasons, the industry is seeking a move to more environmentally friendly chemicals.

Replacing the organic propellants, such as those listed above, by non-liquifiable propellant gases presents new problems. Unlike more conventional liquifiable organic propellant gases, gases such as carbon dioxide and nitrous oxide cannot be liquified at the pressures obtainable in an aerosol container (i.e. typically 10 to 12 bar maximum). As the foaming composition is progressively emptied out of the aerosol canister the carbon dioxide or nitrous oxide in the headspace cannot be replenished as would be the case with liquifiable propellants, and consequently the pressure in the headspace drops. If the headspace pressure drops too low it will no longer be possible to dispense a foam from the aerosol container.

Attempts to address this problem have included the use of microporous structures to adsorb non-liquifiable propellant gas (such as carbon dioxide), thereby providing a "reservoir" of gas from which the headspace pressure can be replenished.

EP-A 0 385 773, published on Sep. 5, 1990, discloses a gas storage system comprising a polymeric material, such as hydrogel, having microvoids functioning as interstitial stores for gas.

DD-A 246 784, published on Jun. 17, 1987, discloses cosmetic and pharmaceutical foam aerosols containing 5–50% of CO2-charged aluminosilicate. It is claimed that filling rates are high, pressure peaks are avoided, and pressure is substantially constant up to complete emptying of the aerosol package.

The applicants co-pending European Patent Application number 94870189.1, filed on Dec. 5, 1994, discloses a foaming detergent composition for cleaning textile fabrics which may be dispensed with the aid of propellants including hydrofluorocarbons (HFCs) or low molecular weight hydrocarbons.

Foaming compositions which are concentrated in terms of active components, and have a correspondingly low water content may not be suitable for dispensing with carbon dioxide or nitrous oxide because the aerosol container cannot be completely emptied. Furthermore microporous gas adsorbant agents may be undesirable for economic reasons.

The present invention is concerned with a means of delivering a concentrated foam without the need for microporous gas adsorbant agents.

The object of the invention is to provide a packaged product comprising a foaming composition comprising a surfactant system and wherein the foaming composition comprises less than 25% by weight, preferably less than 15% by weight, of water; a propellant gas; and a container; such that the foaming composition may be completely dispensed from a container by an environmentally-friendly (inorganic) propellant gas.

A further object of the invention is to provide a low water composition which reduces the formation of $HCO_3^-$ ions when carbon dioxide is the propellant gas. The formation of these ions results in lower propellant gas efficiency because the carbon dioxide is converted into bicarbonate.

A further object of the invention is to provide a low water composition suitable for maintaining enzymes in a stable state. In particular the compositions of the present invention are suitable for use with detergent enzymes.

SUMMARY OF THE INVENTION

According to the invention these objects are achieved by a packaged product as specified in claim 1 in which the viscosity of the foaming composition, measured at 20° C. and 1 atmosphere, using a Brookfield viscometer, Spindle No. 2, at 60 rpm, is less than 700 mPa·s and preferably less than 500 mPa·s and the propellant gas comprises carbon dioxide, nitrous oxides, or mixtures thereof.

In order to achieve the required viscosity control the foaming composition may further comprise a viscosity reducing, organic solvent, such as those selected from the group consisting of polyethylene glycol, short chain alkyl ethoxylates, glycerol, Carbowax, butyl diglycerol ether, or mixtures thereof.

Preferably the foaming composition comprises at least 18% by weight of the surfactant system consisting essentially of anionic surfactant and, optionally, nonionic surfactant.

In one embodiment of the invention, the propellant gas is selected from the group consisting of carbon dioxide, nitrous oxides, or mixtures thereof.

In an alternative embodiment of the invention the propellant gas further comprises an organic propellant such as propane, butane, pentane, hexane, or mixtures thereof.

In a further aspect of the invention a method of cleaning textile fabrics using the foaming compositions described herein is provided. In a particularly preferred method, very low amounts of water can be used in order to effect the cleaning method compared to conventional washing processes in very dilute aqueous solutions. This results in less lower energy requirements to heat water, and in environmental benefits including lower demands on waste water treatment.

DETAILED DESCRIPTION OF THE INVENTION

Foam is a coarse dispersion of gas in a relatively small amount of liquid. The foams of the present invention are a continuous liquid phase comprising a composition, and a dispersed phase comprising a gas. Typically, the gas "bubbles" of the dispersed phase can vary in size from 50 micrometers to several millimeters.

In general, the quality of the foam is determined by assessing various foam quality attributes, such as: 1) the appearance of the foam as it is determined by the uniformity of the bubble size distribution, as well as by the actual bubble sizes, wherein small and uniformly sized bubbles are generally preferred; 2) the thickness of the foam as it is determined by the apparent foam viscosity, wherein a greater apparent foam viscosity is generally preferred; 3) the density of the foam which is preferably less than 250 g/l, more preferably less than 150 g/l, and most preferably less than 100 g/l; and 4) the drainage of the liquid from the foam upon standing on a solid surface, wherein slow drainage of the liquid is generally preferred.

Preferred components of the detergent foam will now be described in more detail.

Water-soluble salts of the higher fatty acids, i.e., "soaps", are useful anionic surfactants in the compositions herein. This includes alkali metal soaps such as the sodium, potassium, ethanolamine, ammonium, and alkylammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the ethanolamine, sodium and potassium salts of the mixtures of fatty acids derived from coconut oil and tallow, i.e., monoethanolamine, sodium or potassium tallow and coconut soap.

Useful anionic surfactants also include the water-soluble salts, preferably the alkali metal, ethanolamine, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the alkyl sulfates, especially those obtained by sulfating the higher alcohols ($C_8$–$C_{18}$ carbon atoms) such as those produced by reducing the glycerides of tallow or coconut oil; and the alkyl benzene sulfonates in which the alkyl group contains from about 9 to about 15 carbon atoms, in straight or branched chain configuration, e.g., those of the type described in U.S. Pat. Nos. 2,220,099 and 2,477,383; and methyl ester sulphonates. Especially valuable are linear straight chain alkyl benzene sulfonates in which the average number of carbon atoms in the alkyl group is from about 11 to 13, abbreviated as $C_{11}$–$C_{13}$ LAS.

Other anionic surfactants herein are the alkyl glyceryl ether sulfonates, especially those ethers of higher alcohols derived from tallow and coconut oil; coconut oil fatty acid monoglyceride sulfonates and sulfates; salts of alkyl phenol ethylene oxide ether sulfates containing from about 1 to about 10 units of ethylene oxide per molecule and wherein the alkyl groups contain from about 8 to about 12 carbon atoms; and salts of alkyl ethylene oxide ether sulfates containing from about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; watersoluble salts of olefin sulfonates containing from about 12 to 24 carbon atoms; and beta-alkyloxy alkane sulfonates containing from about 1 to 3 carbon atoms in the alkyl group and from about 8 to about 20 carbon atoms in the alkane moiety.

Water-soluble nonionic surfactants are also useful as surfactants in the compositions of the invention. Indeed, preferred processes use anionic/nonionic blends. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 16 carbon atoms, in either a straight chain or branched chain configuration, with from about 4 to 25 moles of ethylene oxide per mole of alkyl phenol.

Preferred nonionics are the water-soluble condensation products of aliphatic alcohols containing from 8 to 22 carbon atoms, in either straight chain or branched configuration, with from 1 to 25 moles of ethylene oxide per mole of alcohol, especially 2 to 7 moles of ethylene oxide per mole of alcohol. Particularly preferred are the condensation products of alcohols having an alkyl group containing from about 9 to 15 carbon atoms; and condensation products of propylene glycol with ethylene oxide.

Other preferred nonionics are polyhydroxy fatty acid amides which may be prepared by reacting a fatty acid ester and an N-alkyl polyhydroxy amine. The preferred amine for use in the present invention is N—(R1)—CH2(CH2OH)4—CH2—OH and the preferred ester is a C12–C20 fatty acid methyl ester. Most preferred is the reaction product of N-methyl glucamine (which may be derived from glucose) with C12–C20 fatty acid methyl ester.

Methods of manufacturing polyhydroxy fatty acid amides have been described in WO 9206073, published on Apr. 16, 1992. This application describes the preparation of polyhydroxy fatty acid amides in the presence of solvents. In a highly preferred embodiment of the invention N-methyl glucamine is reacted with a C12–C20 methyl ester.

Semi-polar nonionic surfactants include water-soluble amine oxides containing one alkyl moiety of from about 10 to 18 carbon atoms and 2 moieties selected from the group consisting of alkyl groups and hydroxyalkyl groups containing from 1 to about 3 carbon atoms; water-soluble phosphine oxides containing one alkyl moiety of about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Ampholytic surfactants include derivatives of aliphatic or aliphatic derivatives of heterocyclic secondary and tertiary amines in which the aliphatic moiety can be either straight or branched chain and wherein one of the aliphatic substituents contains from about 8 to 18 carbon atoms and at least one aliphatic substituent contains an anionic water-solubilizing group.

Zwitterionic surfactants include derivatives of aliphatic quaternary ammonium phosphonium, and sulfonium compounds in which one of the aliphatic substituents contains from about 8 to 18 carbon atoms.

Useful cationic surfactants include water-soluble quaternary ammonium compounds of the form $R_4R_5R_6R_7N^+X^-$, wherein $R_4$ is alkyl having from 10 to 20, preferably from 12–18 carbon atoms, and $R_5$, $R_6$ and $R_7$ are each $C_1$ to $C_7$ alkyl preferably methyl; $X^-$ is an anion, e.g. chloride. Examples of such trimethyl ammonium compounds include $C_{12-14}$ alkyl trimethyl ammonium chloride and cocalkyl trimethyl ammonium methosulfate.

Other surfactants that may be used in the compositions of the present invention include C10–C18 glycerol ethers, C10-18 alkyl polyglycoside and their corresponding sulphated polyglycosides, alkyl ester sulphonates, and oleoyl sarcosinate.

Enzymes can be included in the foaming compositions herein for a wide variety of fabric laundering purposes, including removal of protein-based, carbohydrate-based, or triglyceride-based stains, for example, and for the prevention of refugee dye transfer, and for fabric restoration. The enzymes to be incorporated include proteases, amylases, lipases, cellulases, and peroxidases, as well as mixtures thereof. Other types of enzymes may also be included. They may be of any suitable origin, such as vegetable, animal, bacterial, fungal and yeast origin. However, their choice is governed by several factors such as pH-activity and/or stability optima, thermostability, stability versus active detergents, builders and so on. In this respect bacterial or fungal enzymes are preferred, such as bacterial amylases and proteases, and fungal cellulases.

Enzymes are normally incorporated at levels sufficient to provide up to about 5 mg by weight, more typically about 0.01 mg to about 3 mg, of active enzyme per gram of the composition. Stated otherwise, the compositions herein will typically comprise from about 0.001% to about 5%, preferably 0.01%–1% by weight of a commercial enzyme preparation. Protease enzymes are usually present in such commercial preparations at levels sufficient to provide from 0.005 to 0.1 Anson units (AU) of activity per gram of composition.

Suitable examples of proteases are the subtilisins which are obtained from particular strains of *B. subtilis* and *B. licheniforms*. Another suitable protease is obtained from a strain of Bacillus, having maximum activity throughout the pH range of 8–12, developed and sold by Novo Industries A/S under the registered trade name ESPERASE. The preparation of this enzyme and analogous enzymes is described in British Patent Specification No. 1,243,784 of Novo. Proteolytic enzymes suitable for removing protein-based stains that are commercially available include those sold under the tradenames ALCALASE and SAVINASE by Novo Industries A/S (Denmark) and MAXATASE by International Bio-Synthetics, Inc. (The Netherlands). Other proteases include Protease A (see European Patent Application 130,756, published Jan. 9, 1985) and Protease B (see European Patent Application Serial No. 87303761.8, filed Apr. 28, 1987, and European Patent Application 130,756, Bott et al, published Jan. 9, 1985).

Amylases include, for example, a-amylases described in British Patent Specification No. 1,296,839 (Novo), RAPIDASE, International Bio-Synthetics, Inc. and TERMAMYL, Novo Industries.

The cellulase usable in the present invention include both bacterial or fungal cellulase. Preferably, they will have a pH optimum of between 5 and 9.5. Suitable cellulases are disclosed in U.S. Pat. No. 4,435,307, Barbesgoard et al, issued Mar. 6, 1984, which discloses fungal cellulase produced from Humicola insolens and Humicola strain DSM1800 or a cellulase 212-producing fungus belonging to the genus Aeromonas, and cellulase extracted from the hepatopancreas of a marine mollusk (Dolabella Auricula Solander). suitable cellulases are also disclosed in GB-A-2, 075,028; GB-A-2,095,275 and DE-OS-2,247,832. CAREZYME (Novo) is especially useful.

Suitable lipase enzymes for detergent usage include those produced by microorganisms of the Pseudomonas group, such as Pseudomonas stutzeri ATCC 19.154, as disclosed in British Patent 1,372,034. See also lipases in Japanese Patent Application 53,20487, laid open to public inspection on Feb. 24, 1978. This lipase is available from Amano Pharmaceutical Co. Ltd., Nagoya, Japan, under the trade name Lipase P "Amano," hereinafter referred to as "Amano-P." Other commercial lipases include Amano-CES, lipases ex Chromobacter viscosum, e.g. Chromobacter viscosum var. lipolyticum NRRLB 3673, commercially available from Toyo Jozo Co., Tagata, Japan; and further Chromobacter viscosum lipases from U.S. Biochemical Corp., U.S.A. and Disoynth Co., The Netherlands, and lipases ex Pseudomonas gladioli. The LIPOLASE enzyme derived from Humicola lanuginosa and commercially available from Novo (see also EPO 341,947) is a preferred lipase for use herein.

Peroxidase enzymes are used in combination with oxygen sources, e.g., percarbonate, perborate, persulfate, hydrogen peroxide, etc. They are used for "solution bleaching," i.e. to prevent transfer of dyes or pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT International Application WO 89/099813, published Oct. 19, 1989, by O. Kirk, assigned to Novo Industries A/S.

A wide range of enzyme materials and means for their incorporation into synthetic detergent compositions are also disclosed in U.S. Pat. No. 3,553,139, issued Jan. 5, 1971 to McCarty et al. Enzymes are further disclosed in U.S. Pat. No. 4,101,457, Place et al, issued Jul. 18, 1978, and in U.S. Pat. No. 4,507,219, Hughes, issued Mar. 26, 1985, both. Enzyme materials useful for liquid detergent formulations, and their incorporation into such formulations, are disclosed in U.S. Pat. No. 4,261,868, Hora et al, issued Apr. 14, 1981. Enzymes for use in detergents can be stabilized by various techniques. Enzyme stabilization techniques are disclosed and exemplified in U.S. Pat. No. 3,600,319, issued Aug. 17, 1971 to Gedge, et al, and European Patent Application Publication No. 0 199 405, Application No. 86200586.5, published Oct. 29, 1986, Venegas. Enzyme stabilization systems are also described, for example, in U.S. Pat. No. 3,519,570.

The foam of the present invention can contain neutral or alkaline salts which have a pH in solution of seven or greater, and can be either organic or inorganic in nature. The builder salt assists in providing the desired density and bulk to the detergent granules herein. While some of the salts are inert, many of them also function as detergency builder materials in the laundering solution.

Examples of neutral water-soluble salts include the alkali metal, ethanolamine, ammonium or substituted ammonium chlorides, fluorides and sulfates. The sodium, ethanolamine and ammonium salts of the above are preferred. Citric acid and, in general, any other organic or inorganic acid may be incorporated into the present invention.

Other useful water-soluble salts include the compounds commonly known as detergent builder materials. Builders are generally selected from the various water-soluble, alkali metal, ethanolamine, ammonium or substituted ammonium phosphates, polyphosphates, phosphonates, polyphosphonates, carbonates, silicates, borates, and polyhydroxysulfonates. Preferred are the sodium, ethanolamine and ammonium salts of the above.

Specific examples of inorganic phosphate builders are sodium and potassium tripolyphosphate, pyrophosphate, polymeric metaphosphate having a degree of polymerization of from about 6 to 21, and orthophosphate. Examples of polyphosphonate builders are the salts of ethylene diphosphonic acid, the salts of ethane 1-hydroxy-1,1-diphosphonic acid and the salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, incorporated herein by reference. In general, however, phosphates are preferably avoided for environmental reasons.

Examples of nonphosphorus, inorganic builders are sodium and potassium carbonate, bicarbonate, sesquicarbonate, tetraborate decahydrate, and silicate having a molar ratio of $SiO_2$ to alkali metal oxide of from about 0.5 to about 4.0, preferably from about 1.0 to about 2.4.

Another component of the foaming compositions useful herein comprises nonaqueous, viscosity by reducing, organic solvent (s). The term "solvent" is used herein to connote non-surface active or low surface active materials that dissolve into the detergent composition matrix having a vicosity reduction effect on the composition. This effect is generally a result of their interaction with the surfactant-water system present in the formulations preventing the formulation of liquid crystal phases. The term "solvent" is not meant to require that the solvent material be capable of actually dissolving all of the detergent composition components added thereto.

The non-aqueous organic materials which are employed as solvents herein can be liquids of high or low polarity. High polarity liquids, suitable as solvents are for example short chain alcohols (ethanol, propanol, propane-diol, etc), short chain aldehydes (methylal, acetaldehyde, etc), short chain ketones (acetone, propanone, etc) and short chain ethers.

Other polar materials useful in some cases are glycerols, glycols and short chain ethoxylated alcohols (short chain nonionic surfactants)

The short chain nonionic surfactants for use herein are alkoxylated alcohols accordig to the formula:

wherein R is a C6 to C10 straight or branched, hydrocarbon chain and n, representing the average ethoxylation degree, is from 1 to 10, or mixtures thereof. A is ethylene oxide or propylene oxide or mixtures thereof.

Suitable surfactants for use herein can readily be made by condensing alcohols having the desired chain length with propylene or ethylene oxide, or mixtures thereof. Suitable short chain alkoxylated for use herein are commercially available from several suppliers, for example Dehydrol O4® from Henkel (C8EO4), Mergital C4® from Sidobre (C8EO4), and Imbentin AG/810/050® and AG/810/080® from Kolb (respectively C8-10EO5 and C8-10EO8).

Suitable types of low-polarity solvents useful in the nonaqueous liquid detergent compositions herein include alkylene glycol mono lower alkyl ethers, lower molecular weight polyethylene glycols, lower molecular weight methyl esters and amides, and the like.

A preferred type of nonaqueous, low-polarity solvent for use herein comprises the mono-, di-, tri-, or tetra-$C_2$–$C_3$ alkylene glycol mono $C_2$–$C_6$ alkyl ethers. The specific examples of such compounds include diethylene glycol monobutyl ether, tetraethylene glycol monobutyl ether, dipropolyene glycol monoethyl ether, and dipropylene glycol monobutyl ether. Diethylene glycol monobutyl ether and dipropylene glycol monobutyl ether are especially preferred. Compounds of the type have been commercially marketed under the tradenames Dowanol, Carbitol, and Cellosolve.

Another preferred type of nonaqueous, low-polarity organic solvent useful herein comprises the lower molecular weight polyethylene glycols (PEGs) . Such materials are those having molecular weights of at least about 150. PEGs of molecular weight ranging from about 200 to 600 are most preferred.

Yet another preferred type of non-polar, nonaqueous solvent comprises lower molecular weight methyl esters. Such materials are those of the general formula : $R^1$—C(O)—$OCH_3$ wherein $R^1$ ranges from 1 to about 18. Examples of suitable lower molecular weight methyl esters include methyl acetate, methyl propionate, methyl octanoate, and methyl dodecanoate.

The nonaqueous, organic solvent(s) employed should, of course, be compatible and non-reactive with other composition components, used in the foaming compositions herein. Such a solvent component will generally be utilized in an amount of from about 1% to 60% by weight of the composition. More preferably, the nonaqueous, organic solvent will comprise from about 5% to 40% by weight of the composition, most preferably from about 10% to 25% by weight of the composition.

Foam stabilising agents may also be employed in the compositions of the present invention. Especially preferred are alyphatic alcohols such as straight chain saturated alcohols of 12 to 18 carbon atoms e.g. cetyl alcohol, stearyl alcohol, myristyl alcohol and mixtures thereof.

Polymers including polyvinylpyrrolidone, polyvinyl alcohol, polyacrylamide, polypeptides, polysaccharides, cellulose derivatives; and also natural and synthetic gums and resins such as guar gum, xanthan gum, carageenan, sodium alginate and caseinate may also be used in the present invention.

Textile fabrics are any materials made from cloth, including garments such as shirts, blouses, socks, skirts, trousers, jackets, underwear etc, and also including tablecloths, towels, curtains etc. The definition of textile fabrics as used herein does not include carpets and similar floor coverings.

Textile fabrics which are to be used in the present invention are commonly made by weaving or knitting. Many different fibres may be used to produce woven, knitted or other types of textile fabric including synthetic fibres (such as polyester, polyamide, etc.) and natural fibres from plants (such as cotton, hemp) and from animals (such as wool, angora, silk). Blends of different fibres are also commonly used.

It is important to distinguish between the foam of the present invention and the suds which are commonly encountered in everyday washing process. The foam of the present invention is much more concentrated and comprises less water than conventional suds. The foam of the present invention comprises less than 25%, and preferably less than 15% by weight of water. The foam of the present invention preferably comprises at least 18% by weight, and preferably at least 25% by weight of a surface active agent. Most preferred foams for use as cleaning compositions comprise at least 10% by weight, preferably at least 20% by weight of anionic surfactant.

On the other hand, suds, which are formed in conventional washing process when detergents are diluted prior to washing, are formed from quite dilute solutions typically 100 g of product in 10 liters of water. The result is a wash liquor which comprises about 99% by weight of water. A layer of suds may form on the surface of the wash liquor, the composition of the suds being similar to that of the wash liquor itself. The surfactant content of the suds will normally be much less than 1%, typically less than 0.3%. Consequently the difference between the foam of the present invention and the suds of a conventional washing process will be understood.

It will also be recognised by the man skilled in the art that suds are often considered undesirable in the washing process and antisuds agents are often employed to reduce or control them. In a washing process in which the solution of detergent active agents is the medium of transport of the actives to the fibre surface, the presence of suds can diminish washing performance. This is because the detergent actives which are in the suds are no longer dissolved in the washing liquor itself, and are not therefore efficiently transported to the fibre surface.

The packaged product of the present invention comprises a sealed container, such as an essentially cylindrical bottle, having a dispensing means such as a nozzle. The container contains the composition and propellant gas. Suitable containers may be made from any material, especially aluminium, tin-plate, plastics including PET, OPP, PE or polyamide and including mixtures, laminates or other combinations of these. Foam is dispensed when the nozzle is activated and the detergent is released together with the propellant gas. The propellant gas expands to form many "bubbles" within the composition thereby creating the foam.

Propellant Gas

The propellant gas of the present invention comprises carbon dioxide, or nitrous oxide (especially N2O), or mixtures thereof. Most preferred is carbon dioxide. Minor amounts of low molecular weight hydrocarbons, such as propane, butane, pentane, hexane, may optionally be included provided that flammability requirements are not exceeded.

Various ways to pressurise the propellant gas are known in the art. For example the gas may be pressurised at the time of packing. The product may be physically separated from a compressed gas by a membrane such as rubber under tension. Alternatively a means for pressurising the gas subsequently by mechanical action may be provided (so-called "pump and spray" systems).

Various apparatus for delivering foams are described in U.S. Pat. No. 5,364,031 issued on Nov. 15, 1994 entitled "Foam Dispensing Nozzles and Dispensers Employing Said Nozzles". Any nozzle or nozzle/valve assembly which provides a means for releasing the mixture of detergent ingredients from the container and provides a foam is suitable for use in the present invention. The Precision Valve Company (Valve Precision in France) supplies a range of nozzle assemblies for various applications including shaving foams and carpet cleaners under various trade names including City®, Montego®, Power Jet®, Vulcan® and Visco®. Nozzles which disperse the foam both horizontally and vertically (when the container is held upright) are available. Metering nozzles which dispense a predetermined amount of foam are also available and useful in the present invention. Metering valves are disclosed in WO9108965 (Precision Valve Co) and EP-A 616953 (3M Co). In order for the apparatus to be effective in the method of the present invention it should deliver the foam at a rate of at least 3 g per second of foam from the sealed container, more preferably at a rate of at least 10 g per second.

Method of Cleaning

Handwash

The method of the present invention may be used to wash textile fabrics by hand (referred to herein as "handwash"). The foam is dispensed onto or around the textile fabrics to be washed, and then the foam is thoroughly distributed over the textile fabrics, if necessary, by agitating the textile fabrics and foam by hand. It is believed that the high surface area of the foam enables the active ingredients to be well-distributed over the surface of the textile fabrics. Furthermore it is believed that the intimate proximity of the active, non-diluted foam to the textile fabrics promotes excellent cleaning.

The textile fabrics may be left to soak in the foam for anything up to several days, or even weeks. However it is preferred that the soaking time is between 1 minute and 24 hours, preferably between 5 minutes and 4 hours.

If desired any foam residue may subsequently be removed from the textile fabrics. For example the residue may be rinsed out using clean water or it may be removed from the textile fabrics by applying a vacuum. Water is used to presoak or rinse, or presoak and rinse, the textile fabrics, wherein the weight ratio of water to dry fabric is less than 1:1.

The method of the present invention is particularly well-suited to hand washing of delicate textile fabrics. In particular textile fabrics comprising high levels of wool or silk may be advantageously treated in this way. One particular benefit is a marked reduction in local fabric damage which may occur when conventional laundry processes are used. In conventional laundry processes the composition, the soiled textile fabrics and water are all brought together in a suitable container. At the beginning of the process there are very high local concentrations of active ingredients as they begin to dissolve in the water, but before they have been homogeneously distributed in the water. Such high local concentrations in solution, if they happen to be present on or close to the fabric can cause local fabric damage. This is especially true in the case of high local concentrations of bleaching agents and optical brighteners in solution. This type of local fabric damage is avoided according to the method of the present invention. Because all of the active ingredients are uniformly distributed throughout the large volume of the foam there are no local concentrations of active materials which might cause fabric damage.

A typical handwash composition will comprise some or all of the following components : surfactants (anionic, nonionic, cationic, amphoteric, zwitterionic), detergent builders and chelating agents, soil release polymers, optical brightener, dye transfer inhibition polymer, perfume, enzymes, colorants.

Surfactants are preferably present at a level of from 10% to 90% by weight of the composition, preferably 20% to 80% of the composition, more preferably from 25% to 50% of the composition and most preferably about 30% by weight of the composition.

Detergent builders such as fatty acids, citric acid, succinic acid, phosphate, zeolite are preferably present at a level of from 10% to 90% by weight of the composition, preferably 10% to 50% of the composition, more preferably from 12% to 20% by weight of the composition.

Chelating agent such as phosphonate are preferably present at a level of from 0% to 5%, more preferably from 0.1% to 3% by weight of the composition.

Machine Wash

The method of the present invention may be used to wash textile fabrics in a conventional washing machine or, alternatively, if no added water is required, in a conventional drying machine (both cases referred to herein as "machine wash") . The foam of the present invention is simply dispensed into the drum of the machine either before or after the soiled textile fabrics have been loaded.

Most commercially available washing machines have automatic washing cycles, and many of these cycles start by the addition of water into the machine drum. However, to fall within the scope of the present invention it is necessary for the concentrated foam to be thoroughly dispersed over the textile fabrics without being dissolved in solution. Preferably this is achieved using a washing machine with a washing cycle in which the drum is rotated several times (thereby distributing the foam) before any water is added. However, this does not exclude the step of presoaking the textile fabrics prior to the treatment with the foam from the present invention.

If water is to be added at a later part of the cycle most of the foam components will be dissolved or dispersed in the water, probably resulting in a layer of suds in the machine. As noted above, these suds which have a high water content and a low surfactant content should not be considered as foam within the meaning of the present invention.

The wash cycle may be completed by any combination of washing, rinsing, conditioning and/or drying steps, during any one of which additional wash or rinse additives may be introduced into the machine drum.

The compositions suitable for machine wash foams are similar to those described above for handwash foams.

Test Methods

A. Foam Density

A glass beaker, 62 mm internal height, 111 mm internal diameter, is degreased with a standard soap solution and well rinsed with distilled water. The beaker is filled with foam until overflowing, excess foam being immediately scraped off using a straight edge wiped across the top edge of the beaker. The difference in weight of the full beaker (W2) minus the empty beaker (W1) is the weight of foam. The volume of the beaker (V) is known. Foam density is calculated by (W2-W1)V.

B. Foam Stability in Air

A glass beaker, 62 mm internal height, 111 mm internal diameter, is degreased with a standard soap solution and well rinsed with distilled water. The beaker is filled with foam until overflowing, excess foam being immediately scraped off using a straight edge wiped across the top edge of the beaker.

The time taken for the foam to collapse to half the total volume of the glass beaker is an indication of the foam stability in air. In this test the time taken for the foam to collapse to half the height of the glass beaker is measured and recorded.

EXAMPLES

Liquid laundry compositions were prepared by mixing the components according to the compositions in Table 1. Then each composition was packed into metal containers, each container having a nominal capacity of 405 cubic centimeters. The cans were filled with 250 ml of liquid detergent and then were pressurised with carbon dioxide while shaking, until it equilibrates to a can pressure of about 10 bars of carbon dioxide at about 20° C.

All the cans are fitted with a 3×1.0 mm diameter standard valve (Code No. 045380 supplied by Valve Precision), without a dip tube and a straight whipped cream nozzle. In order to expel the foam out of the can, the can must be in an inverted position.

The cans were allowed to rest for a day at room temperature (about 20° C.) before the testing for the foam characteristics is performed. Immediately before the testing is done, the cans were thoroughly shaken by hand to ensure homogeneity of the components inside the can. All foam densities and stabilities were measured based upon the first discharge of foam from the filled aerosol container.

The results of the methods described above are shown in Table 2.

TABLE 1

Liquid Matrix Compositions

| | 1 | 2 | 3 | 4 | 5 | 6 | 7 |
|---|---|---|---|---|---|---|---|
| Alkyl sulphate | 7.44 | 7.44 | 9.57 | 7.97 | 10.10 | 7.44 | 9.57 |
| Alkyl ethoxy sulphate | 6.38 | 6.38 | 8.20 | 6.84 | 8.66 | 6.38 | 8.20 |
| Nonionic C12/C15 E7 | 10.62 | 10.62 | 13.65 | 11.38 | 14.41 | 10.62 | 13.65 |
| NMG | 4.06 | 4.06 | 5.22 | 4.35 | 5.51 | 4.06 | 5.22 |
| Fatty acid | 8.79 | 8.79 | 11.30 | 9.42 | 11.93 | 8.79 | 11.30 |
| Citric acid | 0.87 | 0.87 | 1.12 | 0.93 | 1.18 | 0.87 | 1.12 |
| Propane diol | 9.65 | 9.65 | 12.41 | 10.34 | 13.10 | 9.65 | 12.41 |
| Ethanol | 0.68 | 0.68 | 0.87 | 0.73 | 0.92 | 0.68 | 0.87 |
| Monoethanolamine | 7.52 | 7.52 | 9.67 | 8.06 | 10.21 | 7.52 | 9.67 |
| Ethoxylated TEP | 0.31 | 0.31 | 0.40 | 0.33 | 0.42 | 0.31 | 0.40 |
| Phosphonate | 1.34 | 1.34 | 1.72 | 1.44 | 1.82 | 1.34 | 1.72 |
| Soil release polymer | 0.15 | 0.15 | 0.19 | 0.16 | 0.20 | 0.15 | 0.19 |
| PVNO | 0.24 | 0.24 | 0.31 | 0.26 | 0.33 | 0.24 | 0.31 |
| Enzymes | 0.691 | 0.691 | 0.89 | 0.74 | 0.94 | 0.691 | 0.89 |
| CaCl2 | 0.020 | 0.020 | 0.03 | 0.02 | 0.03 | 0.020 | 0.03 |
| Boric acid | 4.500 | 4.500 | 5.79 | 4.82 | 6.11 | 4.500 | 5.79 |
| PTMS | 0.030 | 0.030 | 0.04 | 0.03 | 0.04 | 0.030 | 0.04 |
| Perfume | 1.200 | 1.200 | 1.54 | 1.29 | 1.63 | 1.200 | 1.54 |
| PEG 200 | 30.00 | 20.00 | 10.00 | | | | |
| Glycerol | | | | 25.00 | | 25.00 | |
| C8EO4 | | | | | 5.00 | 5.00 | |
| Methylal | | | | | | | 10.00 |
| Xanthan Gum | | | | | | | |
| Acetone | | | | | | | |
| Hexylene Glycol | | | | | | | |
| Amyl acetate | | | | | | | |
| Shellsol Degreaser 55 | | | | | | | |
| Water | 5.51 | 15.51 | 7.08 | 5.90 | 7.48 | 5.51 | 7.08 |
| TOTAL | 100 | 100 | 100 | 100 | 100 | 100 | 100 |

TABLE 1-continued

| | \multicolumn{7}{c}{Liquid Matrix Compositions} |
|---|---|---|---|---|---|---|---|
| | 8 | 9 | 10 | 11 | A | B | C |
| Alkyl sulphate | 9.51 | 9.57 | 9.57 | 9.57 | 10.63 | 9.57 | 7.44 |
| Alkyl ethoxy sulphate | 8.16 | 8.20 | 8.20 | 8.20 | 9.11 | 8.20 | 6.38 |
| Nonionic C12/C15 E7 | 13.58 | 13.65 | 13.65 | 13.65 | 15.17 | 13.65 | 10.62 |
| NMG | 5.19 | 5.22 | 5.22 | 5.22 | 5.80 | 5.22 | 4.06 |
| Fatty acid | 11.24 | 11.30 | 11.30 | 11.30 | 12.56 | 11.30 | 8.79 |
| Citric acid | 1.11 | 1.12 | 1.12 | 1.12 | 1.24 | 1.12 | 0.87 |
| Propane diol | 12.34 | 12.41 | 12.41 | 12.41 | 13.79 | 12.41 | 9.65 |
| Ethanol | 0.87 | 0.87 | 0.87 | 0.87 | 0.97 | 0.87 | 0.68 |
| Monoethanolamine | 9.61 | 9.67 | 9.67 | 9.67 | 10.74 | 9.67 | 7.52 |
| Ethoxylated TEP | 0.40 | 0.40 | 0.40 | 0.40 | 0.44 | 0.40 | 0.31 |
| Phosphonate | 1.71 | 1.72 | 1.72 | 1.72 | 1.91 | 1.72 | 1.34 |
| Soil release polymer | 0.19 | 0.19 | 0.19 | 0.19 | 0.21 | 0.19 | 0.15 |
| PVNO | 0.31 | 0.31 | 0.31 | 0.31 | 0.34 | 0.31 | 0.24 |
| Enzymes | 0.88 | 0.89 | 0.89 | 0.89 | 0.99 | 0.89 | 0.69 |
| CaCl2 | 0.03 | 0.03 | 0.03 | 0.03 | 0.03 | 0.03 | 0.02 |
| Boric acid | 5.75 | 5.79 | 5.79 | 5.79 | 6.43 | 5.79 | 4.50 |
| PTMS | 0.04 | 0.04 | 0.04 | 0.04 | 0.04 | 0.04 | 0.03 |
| Perfume | 1.53 | 1.54 | 1.54 | 1.54 | 1.71 | 1.54 | 1.20 |
| PEG 200 | | | | | | | |
| Glycerol | | | | | | | |
| C8EO4 | | | | | | | |
| Methylal | 10.00 | | | | | | |
| Xanthan Gum | 0.50 | | | | | | |
| Acetone | | 10.00 | | | | | |
| Hexylene Glycol | | | 10.00 | | | | |
| Amyl acetate | | | | 10.00 | | | |
| Shellsol Degreaser 55 | | | | | | 10.00 | 30.00 |
| Water | 7.04 | 7.08 | 7.08 | 7.08 | 7.87 | 7.08 | 5.51 |
| TOTAL | 100 | 100 | 100 | 100 | 100 | 100 | 100 |

NMG is C12/C14 N-methyl glucamide.
Ethoxylated TEP is ethoxylated tetraethylenpentamine.
PVNO is polyvinylpyridin-N-oxide.
PTMS is propyl trimethoxysilane.

ShellSol Degreaser 55 is a blend of 95 C9–C11 isoparafins and 5% aliphatic C7-ester plus a corrosion protection agent, commercially sold by Shell Chemicals.

C8EO4 is Dehydrol® supplied by Henkel.

TABLE 2

| | \multicolumn{7}{c}{Summary of Results} |
|---|---|---|---|---|---|---|---|
| | 1 | 2 | 3 | 4 | 5 | 6 | 7 |
| Liquid Matrix | | | | | | | |
| Surfactant (%) | 36.44 | 36.44 | 43.42 | 38.19 | 45.17 | 36.44 | 43.42 |
| Water (%) | 5.51 | 15.51 | 7.08 | 5.90 | 7.48 | 5.51 | 7.08 |
| Viscosity (mPa · s) | 264 | 180 | 451 | 610 | 470 | 450 | 175 |
| Foam properties | | | | | | | |
| Density (g/L) | 78 | 95 | 100 | 107 | 80 | 108 | 66 |
| Stability (min) | 8.0 | 11.0 | n.a. | 18.0 | 11.0 | 9.0 | 1.7 |
| Empty Can | Yes | Yes | Yes | Yes | Yes | Yes | Yes |
| | 8 | 9 | 10 | 11 | A | B | C |
| Liquid Matrix | | | | | | | |
| Surfactant (%) | 43.25 | 43.42 | 43.42 | 43.42 | 46.91 | 43.42 | 36.44 |
| Water (%) | 7.04 | 7.08 | 7.08 | 7.08 | 7.87 | 7.08 | 5.51 |
| Viscosity (mPa · s) | 260 | 114 | 234 | 224 | 885 | 940 | 1700 |
| Foam properties | | | | | | | |
| Density (g/L) | 78 | 70 | 78 | 78 | 91 | 85 | 266 |
| Stability (min) | 10.0 | 1.2 | 5.0 | 2.5 | n.a. | >30 | >30 |
| Empty Can | Yes | Yes | Yes | Yes | No | No | No |

The foaming compositions of each of examples 1 to 12 had a viscosity of less than 700 mPa·s at 20° C., and in each case it was possible to empty the package completely. Comparative examples A to C had a viscosity greater than 700 mPa·s, and it was not possible to empty these packages completely.

For the purposes of these examples, a can was considered to be completely emptied if more than 80% by weight of the contents was discharged. It is generally preferred however that at least 85% by weight, and preferably at least 90% by weight of the contents should be discharged.

We claim:

1. A packaged product for cleaning textile fabrics comprising
   (i) a foaming composition comprising, by weight:
      (a) from 30 % to 90 % of a surfactant, the surfactant including at least an anioinc surfactant;
      (b) from 10 % to 90 % of a detergent builder;
      (c) from about 1% to 60% of a solvent selected from the group consisting of polyethylene glycol, short chain alkyl ethoxylates, glycerol, butyl diglycerol ether and mixtures thereof;
      wherein the foaming composition comprises less than 15% by weight, of water; and
   (ii) a propellant gas;
   (iii) a container;
wherein the propellant gas comprises carbon dioxide, nitrous oxides, or mixtures thereof and the viscosity of the foaming composition, measured at 20° C. and 1 atmosphere, using a Brookfield viscometer, No. 2 Spindle at 60 rpm, is less than 700 mPa·s.

2. A packaged product according to any of claims 1 wherein the propellant gas further comprises an organic propellant.

3. A packaged product according to claim 2 wherein the organic propellant comprises propane, butane, pentane, hexane, or mixtures thereof.

4. A packaged product according to claim 1 wherein the foaming composition further comprises enzymes.

5. A product according to claim 1 wherein the foaming composition further comprises a soil release polymer.

6. A product according to claim 1 wherein the foaming composition comprises from 10% to 50% of a detergent builder.

7. A method of cleaning textile fabrics using a packaged product according to claim 1 comprising the steps of:
   (i) dispensing the foaming composition from the container in the form of a foam having a bulk density less than 250 g/l on to textile fabrics, and
   (ii) distributing the foam, either by mechanical agitation, or by hand, over the textile fabrics
   (iii) removing the foam residue from the cleaned textile fabrics.

8. A method of cleaning textile fabrics according to claim 7 whereby water is used to presoak or rinse, or presoak and rinse, the textile fabrics, wherein the weight ratio of water to dry fabric is less than 1:1.

9. A method of cleaning textile fabrics comprising the steps of:
   (i) preparing a detergent foam according to claim 1;
   (ii) dispensing the detergent foam from the container;
   (iii) dissolving the foam in water to form an aqueous solution; and
   (iv) either subsequently or simultaneously agitating the textile fabrics in the aqueous solution.

* * * * *